United States Patent Office 3,524,944

Patented Aug. 18, 1970

3,524,944

ROUTE AND RE-ROUTE SEARCH, BUSY SIGNAL AND SIGNAL TRANSMISSION IN A MULTI-STAGE SWITCHING NETWORK

Heinz Schluter, Kornwestheim, and Hilmar Schonemeyer, Ditzingen, Germany, assignors to International Telephone and Telegraph Corporation, New York, N.Y., a corporation of Delaware Filed June 16, 1967, Ser. No. 646,626
Claims priority, application Germany, June 28, 1966, St 25,588, St 25,590
Int. Cl. H04q *1/38*
U.S. Cl. 179—18 10 Claims

ABSTRACT OF THE DISCLOSURE

A switching network is equipped with a guide wire network wherein single wires are used during the route search for the busy marking and signal transmission. The offering signal regenerators used during route search depend on the current direction. These regenerators are coupled, via gate circuits, to the guide wire network. After through-connection, the busy potential on the guide wires inhibit the gate circuits. The signal potential has a polarity which is opposite to the polarity of the offering potential. During re-routing, the busy and signal potentials are removed without releasing the established path to allow selection of parts of the established path for use in the re-routed path.

The invention relates to means for making a route or re-route search, giving busy signals, and establishing signal transmission paths in a multi-stage switching network in which a guide wire is through-connected via contacts of crosspoint relays. More particularly, these through-switching contacts in the guide wire network are bridged with the aid of offering signal regenerators, depending on the current direction, for route search.

In known systems of the general type covered by the invention, auxiliary or control wires may be used in many ways. Very often, these wires are separated into different current stages, with current flowing in both current directions from a transmission stage or junctor between two points of an interconnected line.

In telephone systems it is frequently necessary to re-route existing switch paths or partial path connections. For example, a connection from a subscriber circuit to a general purpose junctor may be re-routed to another special purpose junctor. The first path is released as soon as the second one is established. However, it might be that no path is available to the new junctor as long as the first connection exists, but such path would become available if the first path is released.

If the system has a completely centralized control facility with means for storing a memory of the switching condition of the different switching sections of the switching network, such a re-routing can be performed relatively easy. However, the cost of the control means rises considerably if means must be provided for making a selection of the re-routed connection.

Inclusion of the means for making the re-routed connection will be more difficult if no central route storage means exists. The cost is further increased if the connection to be re-routed is not to be released before the new connection can be established.

An object of the invention is to perform route searches, busy signalling, and signal transmission in a multi-stage switching network using guide wires, by a manifold use of a single control wire.

A further object of the invention is to provide for the re-routing of connections in a switching network through a use of guide wires. Particularly, an object is to maintain the original connection which is to be re-routed so that it can participate in the route search.

In keeping with an aspect of the invention, these and other objects are achieved in a multi-stage switching network using guide wires. The guide wires are through-connected, in a known way, via contacts of the crosspoint relay. These through-switching contacts are bridged with the aid of current-dependent offering signal regenerators. The route search is carried out through the guide wires which are not yet through-connected. The busy signalling and the signal transmission is carried out over the guide wires which have been directly through-connected. The route search is performed with a potential of one polarity, while the busy signalling is performed with the reference potential, and the signal transmission is performed with a potential of the other polarity.

All control processes are performed over a single wire in the guide wire network of the switching network. This is possible because the route search, busy signalling and signal transmission are separated in time and by the proper selection of the potentials.

The route search ends responsive to the direct through-connection of the guide wire. This method of search termination offers an advantage since the control circuits for the route search may include simple gates which are blocked to stop the search. These same gate circuits are also blocked by the busy signals as well as by the signal transmission. Thus, the guide wire is available for busy signalling and signal transmission after through-connection. The busy potential in the junctor is applied through a gate circuit which is blocked when a potential is applied for the signal transmission.

The control method is further simplified in that the offering potential for the route search, the busy potential, and the potential for the signal transmission are applied to the output of the switching network, which is associated with the junctor end of a guide wire. Accordingly, the busy indicator circuits and the receiving circuits for the signal transmission can then be connected to the input of the switching network, which is associated with the subscriber end of the guide wire.

According to the invention, different signals can be formed in a simple way. For example, the signals transmitted over the through-connected guide wire may have any of several different amplitudes or a varying pulse duration. To avoid a mutual influence, the signal control circuits responsive to a low potential are decoupled from the control circuits responsive to a higher potential. All control circuits with a low signal potential became ineffective when applying a signal potential.

Re-route is achieved, without releasing the first path, by control signals sent over the guide wires which are through-connected via contacts of the crosspoint relays, as described above. During the re-routing, the busy potential is removed from the connection to be re-routed, and the offering signal regenerators are reconnected with the guide wires. This enables the removal of the busy potential from the through-connected guide wire. Thus, the route sections which were seized to make the original connection may be re-used to make the re-routed connection. This way, all of the previously used equipment may participate during the new re-route search without the necessity of having to release the connection which is to be re-routed. The simple method is, therefore that, by removing the busy potential, the blocking of the gate-circuits is cancelled.

Besides the busy signalling with the aid of the reference potential, signals may also be transmitted over the through-connected guide wire; the signals having a potential which is opposite in polarity to the offering potential. Both the busy potential and the signalling potential are switched off when re-routing a connection. Thus, the new route search can not be influenced by either by the busy or the signalling currents.

The access to the connections which are to be re-routed is made at the junctor end of the guide wire. More particularly, the offering potential, the busy potential, and the signal potential are switched off during re-routing at the output end of the guide wire in the junctor. That means a re-routing signal is required only in the junctor, participating in the connection which is about to be re-routed.

The new method for re-routing connections offers two novel possibilities for the route search. First, when re-routing a connection, an inclusion of the original path to be re-routed in the route search is made dependable upon the unsuccessful completion of a search for a new path. Second, when re-routing a connection, the original path may be included during the first and only route search. In any case, the connection to be re-routed can be maintained and used for busy signalling in case of an unsuccessful re-route search.

The above mentioned and other features of this invention and the manner of obtaining them will become more apparent, and the invention itself will be best understood by reference to the following description of an embodiment of the invention taken in conjunction with the accompanying drawings, in which.

Figure 1:
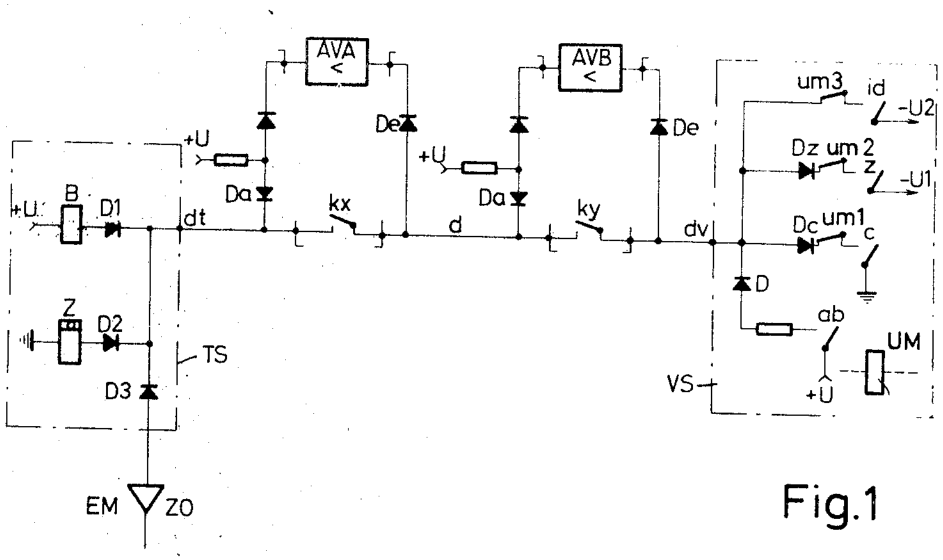
FIG. 1 shows an exemplary guide wire extending across a twin-stage switching network.

The offering potential used during the route search is indicated in FIG. 1 by the symbol +U. This potential is applied by contact *ab* in the junctor VS. This route search is always performed before the busy criterion and a signal transmission over the guide wire *d*. The circuits AVA and AVB are signal regenerators for reforming the offering potential signal. The offering signal regenerators AVA and AVB are connected to the guide wire *d* through electronic gate circuits *de* and *da*.

The circuit works this way. When the contacts *ab* close, the offering potential +U passes through gate diodes *de* and *da* to the offering signal regenerators AVB and AVA. Those regenerators pass the offering signal to the preceding stage. This method of offering is covered by earlier patents, such as U.S. Pat. No. 3,347,995 to H. Schluter and H. Schonemeyer, hereby incorporated by reference.

After selection of the connecting path responsive to the offering signal, the associated crosspoint relays are actuated. Their through-switching contacts *kx* and *ky* are closed to complete the guide wire *d* during the through-connection. Thus, the signal regenerators AVA, AVB and their gate diodes are bypassed, and the guide wire *d* is physically through-connected from the junctor VS to the subscriber circuit TS, after the connection has been established.

The connection is made busy to other equipment by contact *c* of a seize relay (not shown) in the junctor VS. The seize relay is any which operates when the path is completed. The reference or "ground" potential is used as busy potential. It is applied through contacts UMI and diode D*c* to the output *dv* at the junctor and on the input *dt* of the guide wire *d* at the subscriber station TS. The gate circuits D*e* and D*a* connected to the guide wire *d* are made non-conductive by this busy potential so that they cannot pass the positive offering signal U+. Thus, the route including the guide wire *d* cannot participate any more in a future route search.

In the subscriber circuit TS, a relay B operates from the busy ground; therefore, its contacts (not shown) may take over the task of providing a busy indication. But, it is also possible to insert a resistor or to provide a circuit for making a route search dependent upon a direct checking for the busy "ground potential." No additional switching means are necessary in the switching network itself for giving busy signalling. Only the guide wires need be through-connected physically. Also, after the connection has been established, there is no longer any need for an additional wire used exclusively for the route search.

If signals are to be transmitted over this through-connected guide wire *d*, it must be done in a manner such that the busy "ground" potential remains applied through contact *c*. These signals are transmitted over the guide wire *d* with a potential having a polarity which is opposite to the offering polarity, as indicated by the negative polarity marking of the two signal sources −U1 and −U2. The busy potential "ground" thus separates the positive potential offering signal from the negative potential signalling. Therefore, it is important that the busy signal isolating diode D*c* is non-conductive when the circuit is applying the signal voltage −U1 or −U2. The busy indication given by the operated condition of the relay B is maintained because the diode D1 remains conductive at the signal voltages −U1 and −U2. The signal voltage −U1 also passes through the diodes D2 and D3 for any suitable purposes. For example, with the potential −U1, counting pulses can be transmitted via the guide wire *d* during the call to the counter Z—which may be individually assigned to each subscriber. The duration of the pulse is sufficiently long to overcome the mechanical inertia of the counter, as may be gathered from the voltage/time diagram in FIG. 2. If an electronic receiving device having a short responding time is used instead of the counter, and if further pulses with negative signal voltage are transmitted through the guide wire, the electronic receiving device must evaluate both the pulse duration and amplitude.

Identification pulses may also be transmitted over this guide wire. If so, these pulses have the potential −U2 which must then be higher than the potential −U1. On the transmitting end, the junctor diodes D*c* and D*z* are rendered non-conductive by the potential −U1 when contact *id* closes. On the receiving end, the subscriber circuit diodes D1 and D2 are kept conductive so that the busy signalling is maintained. No counting pulses are interrupted, even if one has just been applied. The identification impulse of −U2 potential reaches the final or output marker EM or a translator ZO via the diode D3, and there it is evaluated in any well known manner.

Figure 2:
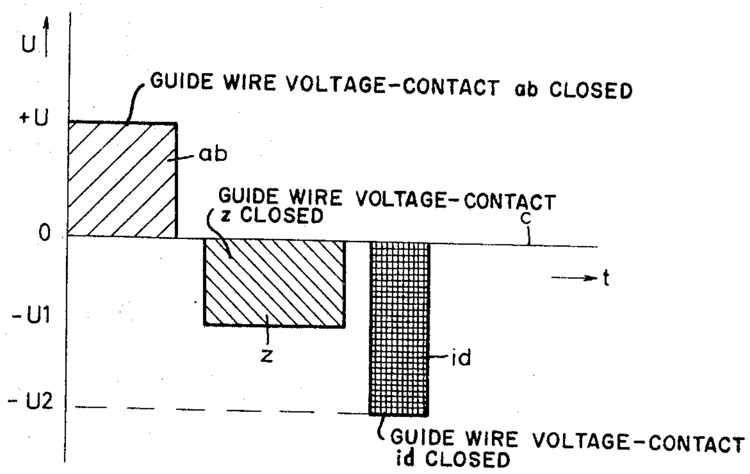
FIG. 2 shows the potential conditions during route search, busy signalling, and signal transmission

The potential conditions for route search, busy signalling and signal transmission are illustrated in FIG. 2. It is emphasized that the route search can also be performed with negative potential and the signal transmission with positive potential.

If the path to subscriber station TS is to be re-routed to another junctor VS, the first route search for the new connection can be made without the aid of the existing connection. However, if no new path is found, the route section of the existing connection may be included in a new route search.

Figure 3:
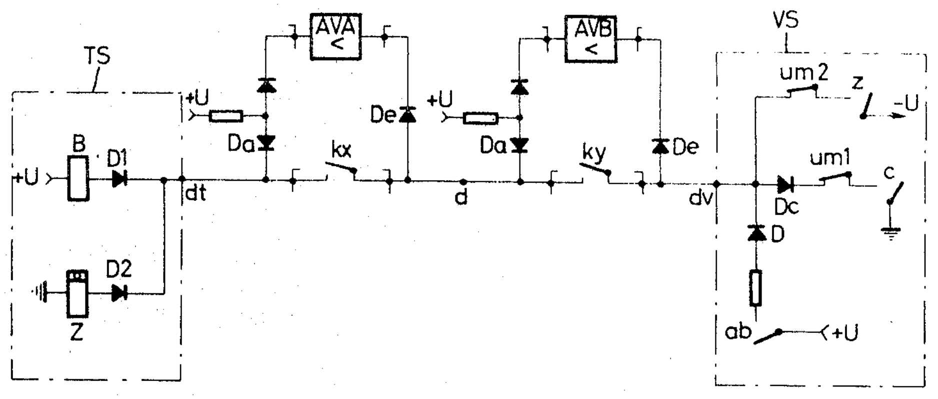
FIG. 3 shows a simplified embodiment of the invention according to FIG. 1 which is of use in describing how calls may be re-routed.

More particularly, as indicated in FIG. 1 and FIG. 3, in the junctor VS, a re-routing relay UM is energized when the old path is to be included in the new re-route search. Contacts *um*1, *um*2, and *um*3 open to break the busy circuit and the signal transmission circuit. This removes the back bias from the gate circuits D*e* and D*a* connected to the guide wire *d* of the existing path which is to be re-routed. The path for the re-route offering potential +U is applied in the guide wire network replica to the route sections of the existing path. Then, any one of these route sections may be seized during the search for the connection to be re-routed. This is made possible by the simple process of cancelling the busy signal without release of the existing path. If a new path is found, the original path is released and the new connection established.

Upon reflection, it should be apparent that the relay *um* may operate either immediately upon the start of a re-route search, or only after an initial failure during such re-route search.

While the principles of the invention have been described above in connection with specific apparatus and applications, it is to be understood that this description is made only by way of example and not as a limitation on the scope of the invention.

We claim:

1. A telephone switching network of the type controlled by signals transmitted over guide wires, said network comprising a plurality of cascaded stages of relay crosspoints, signal regeneration means coupled to said guide wires at said crosspoints, means for applying offering signals to said guide wires for selecting a switch path through said crosspoints, means responsive to the operation of said crosspoints for bridging said regenerator means, and busy marking means for precluding access to said signal regenerating means when said crosspoints are operated.

2. The network of claim 1 wherein said offering signals have a first polarity, and said busy marking has a reference potential, and means for signaling over said guide wire by signals having a polarity which is opposite said first polarity.

3. The network of claim 1 wherein said signal regeneration means are coupled to said guide wires via diode gate means poled to pass said offering signal and to be back biased by said busy marking.

4. The network of claim 1 and a plurality of subscriber lines connected to one side of said network, a plurality of junctors connected to the other side of said network, and gate means in said junctor for applying said offering to said guide wire, said gate means being back biased by said busy potential.

5. The network of claim 1 and means for signaling over said guide wire with potentials having either of two different amplitude levels.

6. The network of claim 1 and means for signaling over said guide wire with pulses having different durations.

7. The network of claim 1 and a plurality of subscriber lines connected to one side and junctors connected to the other side, of said network, means in said junctor for applying said busy marking and means associated with said subscriber lines for giving a busy signal responsive to said marking.

8. A telephone switching network having a separate guide wire network for selecting switch paths, means for through-connecting the guide wires via crosspoint contacts of the network, means for bridging said through-switching contacts to complete a route search responsive to offering signals transmitted over said guide wires, said route search depending on the current direction responsive to said offering signal, means for applying busy markings to through-connected guide wire and means for re-routing a switch path by removing said busy marking from the guide wire of the connection to be re-routed, whereby the guide wire is released for the re-route search without releasing the switch path.

9. The network according to claim 8 and gate means interposed between said guide wire and said bridging means, said busy marking inhibiting said gate means, and means responsive to the removing of the busy potential for cancelling the inhibition of the gate circuit.

10. The network according to claim 8 and means for transmitting signals on the through-connected guide wire with a potential having a polarity which is opposite to the polarity of said offering signals, said busy marking signal being ground potential, and means effective during said re-routing of a connection for removing the signal potential from said guide wires.

References Cited

UNITED STATES PATENTS 3,180,940 4/1965 Korber.

FOREIGN PATENTS 1,146,138 3/1963 Germany.

RALPH D. BLAKESLEE, Primary Examiner

U.S. Cl. X.R.

179—86